United States Patent [19]

Perna

[11] Patent Number: 5,085,392
[45] Date of Patent: Feb. 4, 1992

[54] MOUNTING APPARATUS FOR SECURING AN ELECTRICAL APPLIANCE TO A SUSPENDED CEILING STRUCTURE

[76] Inventor: Anthony M. Perna, 779 Jaques Ave., Rahway, N.J. 07065

[21] Appl. No.: 291,214

[22] Filed: Dec. 28, 1988

[51] Int. Cl.⁵ .............................................. F16B 1/00
[52] U.S. Cl. .................................. 248/343; 248/27.1; 248/906
[58] Field of Search ............... 248/343, 342, 344, 324, 248/214, 247, 27.1, 906; 220/3.2, 3.9, 3.5

[56] References Cited

U.S. PATENT DOCUMENTS

| | | | |
|---|---|---|---|
| 3,001,001 | 9/1961 | Bibb | 52/28 X |
| 3,440,331 | 4/1969 | Cohen | 248/343 X |
| 3,797,791 | 3/1974 | Psencik | 248/343 X |
| 3,912,865 | 10/1975 | Seebinger | 248/343 X |
| 4,041,657 | 8/1977 | Schuplin | 248/343 X |
| 4,048,491 | 9/1977 | Wessman | 248/343 X |

*Primary Examiner*—Karen J. Chotkowski

[57] ABSTRACT

Apparatus for securely and easily mounting an electrical fixture such as a ceiling fan or overhead lighting fixture from a suspended ceiling or standard drywall ceiling and having a support assembly including a ceiling engagement portion, a load supporting portion and an electrical connecting portion. In an embodiment for use with a suspended ceiling, the three portions are integrally formed from a single plate with the ceiling engagement portion formed of four sets of tabs for engaging intersecting suspension grid members; the load supporting portion formed of at least one tab and cable to attach the plate to a ceiling load bearing member, such as a joist; and the electrical connecting portion formed of a housing within which electrical connections may be made. In an embodiment for standard drywall ceiling use, the support assembly is formed in two subassemblies, the first of which is in the form of a plate having an opening and tabs for engagement with the drywall to provide a nesting ring. The second subassembly contains another plate and an electrical junction box over an opening smaller than the opening in the first plate. The plate has locating tabs so that the second subassembly nests within the nesting ring formed by the first assembly.

4 Claims, 5 Drawing Sheets

MOUNTING APPARATUS FOR SECURING AN ELECTRICAL APPLIANCE TO A SUSPENDED CEILING STRUCTURE

BACKGROUND OF THE INVENTION

1. Field of the Invention

The present invention relates to support structures for mounting electrical fixtures and more particularly, to mounting apparatus which can be utilized to easily mount a variety of electrical appliances such as ceiling fans and electrical lighting fixtures securely to suspended ceilings.

2. Description of the Prior Art

With any overhead electrical fixture such as a ceiling fan or overhead light, there is a need to mount the fixture in a convenient manner to either a drop or suspended ceiling. Several methods have existed in the prior art for attaching or mounting fixtures to drop ceilings, including those disclosed in U.S. Pat. No. 3,001,001 to Bibb and U.S. Pat. No. 3,440,331 to Cohen. Further, brackets and apparatus for mounting standard electrical boxes to drop ceilings are known, such as that taught in U.S. Pat. No. 3,025,338 to Cook. However, each of these methods suffers from a number of shortcomings in complexity, difficulty of installation, disturbance of existing structure and lack of flexibility of application. In Bibb for instance, a housing which straddles a suspended ceiling runner intersection is taught. However, the configuration in Bibb requires a complicated housing with a number of distinctive interior chambers configured for appropriate attachment to a specifically configured ceiling grid structure. The structure taught in Bibb is not universally mountable on a number of different grid configurations, and requires a multitude of separately configured complex structures. Further, the mounting apparatus taught in Bibb gains all of its structural support from the grid structure itself, and does not provide auxiliary suspension for the electrical fixture mounted thereto.

In Cohen, which also teaches the mounting of fixtures in the vicinity of a drop ceiling runner intersection, there is a further requirement that the intersection be eliminated entirely and replaced with the device shown. The removal or elimination of the intersection obviously adds expense, makes the mounting process more complicated, and may interfere with the structural integrity of the ceiling assembly. Use of the Cohen device and the necessary adaptation of the grid structure also renders the grid structure unusable should the fixture and mounting bracket need to be eliminated or moved to a new location.

The disadvantages of the prior art are overcome by the present invention which enables the mounting of appliances such as ceiling fans or light fixtures to newly installed or existing ceilings without extensive installation modifications and in a manner which assures solid, vibration-free attachment of the appliance.

SUMMARY OF THE INVENTION

The present invention is summarized in that mounting apparatus for securing an electrical appliance to a suspended ceiling structure, includes a support assembly having a ceiling engagement portion cooperating with the ceiling structure to prevent horizontal movement of the support assembly with respect to the ceiling structure, a load support portion for cooperation with a load bearing member of the ceiling structure to prevent vertical displacement of the support assembly under load, and an electrical coupling portion defining a recess within which electrical connections between a source of electrical power and the electrical appliance may be made, the support assembly having a suitable mounting arrangement to which the electrical appliance may be attached.

It is an object of the present invention to provide a simple, inexpensive and efficient mounting assembly for easily and securely attaching a variety of electrical appliances to a suspended ceiling.

It is another object of the present invention to provide a mounting bracket for electrical fixtures which can be configured for attachment to the intersection of perpendicular runners of a variety of drop ceiling grids.

It is still another object of the present invention to provide a means for securing an electrical fixture or appliance flush with the lowest planar surface of a suspended or drop ceiling.

The present invention is advantageous over the prior art in that it is simple, inexpensive, flexible in application, usable for a variety of different fixtures and able to solidly and securely mount appliances such as ceiling fans to a ceiling structure without vibration. Other objects and advantages of the present invention will become apparent from the following description of the preferred embodiments when taken in conjunction with the accompanying drawing.

DESCRIPTION OF THE PREFERRED EMBODIMENTS

Figure 1:
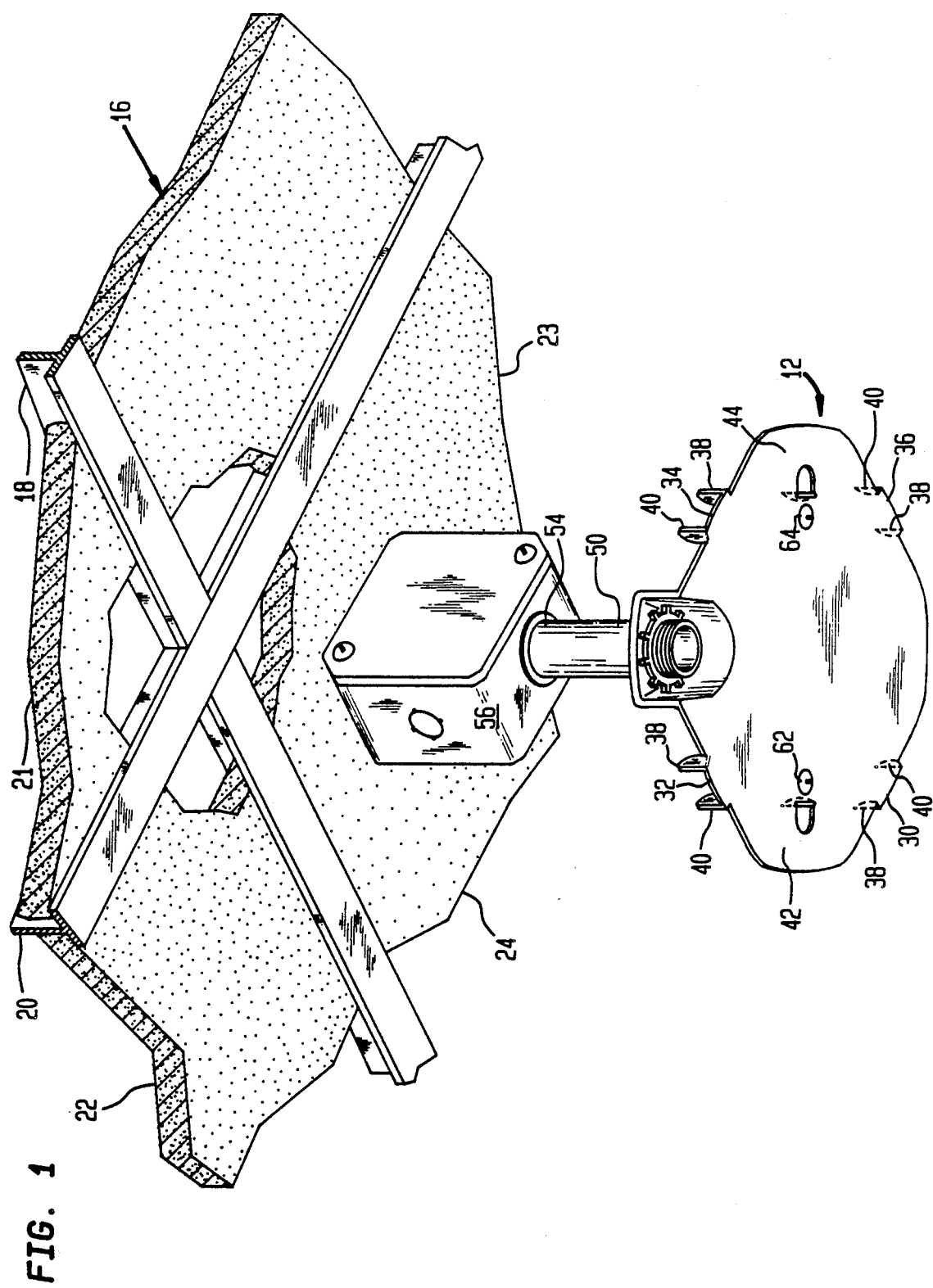
FIG. 1 is an exploded perspective view of a mounting apparatus in accordance with the present invention.

In the preferred embodiment shown in FIG. 1, a mounting apparatus 12 would be secured to intersecting grid members 18 and 20 by four sets of restraining tabs 30, 32, 34 and 36. The mounting apparatus 12 cooperates with grid members 18 and 20 accordingly preventing horizontal movement of the entire structure. Support tabs 42 and 44 provide a means for receiving vertical load support from a structure spaced above the suspended ceiling. Recess 50 provides a means for receiving an electrical connector box 56 within which all connections between the source of power and the electrical fixture or appliance will be made. Screws 62 and 64 provide a standard means for attachment of an electrical lighting fixture or heavy electrical appliance such as a fan.

Figure 2:
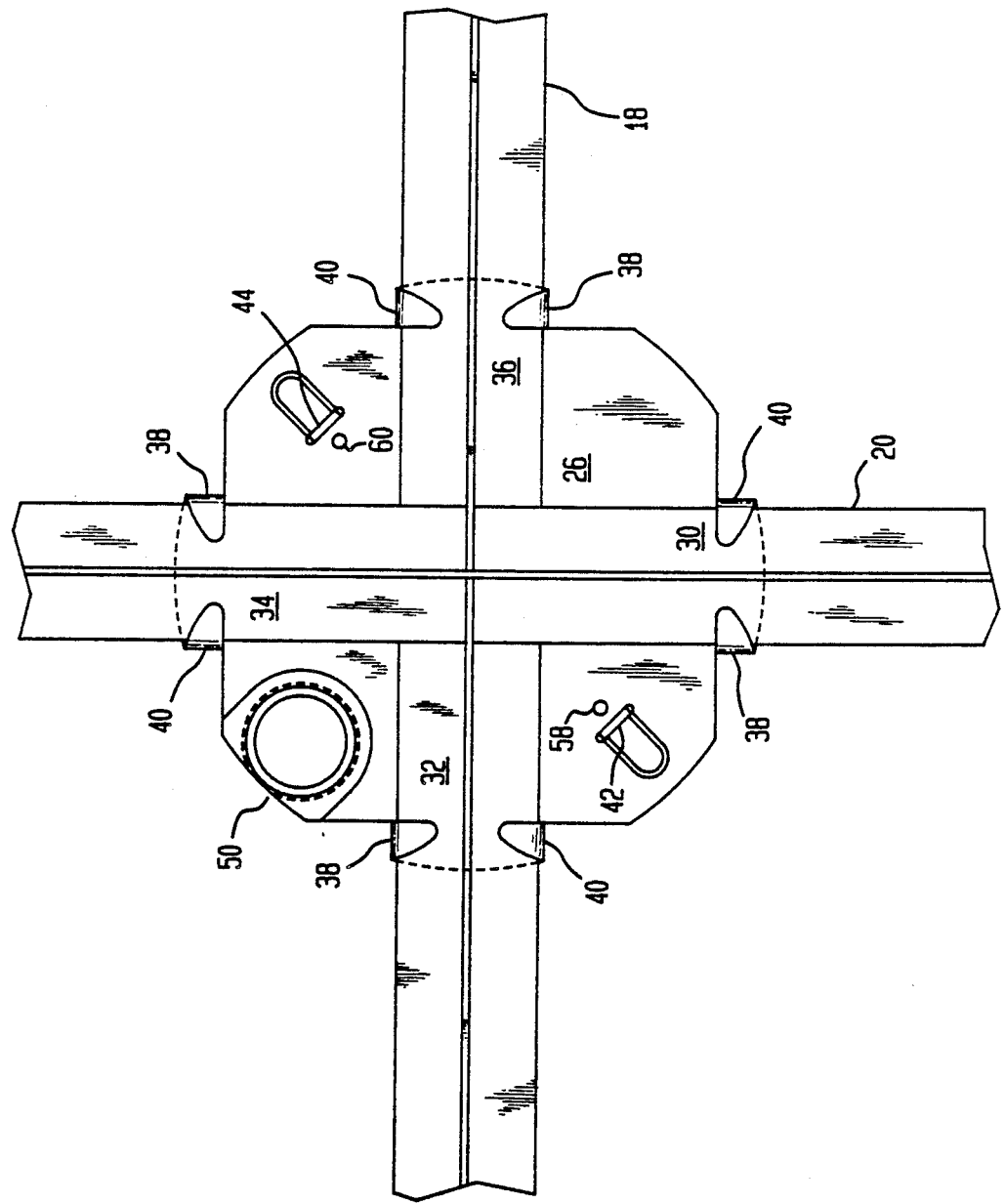
FIG. 2 is a plan view of a mounting apparatus in accordance with the present invention.
Figure 3:
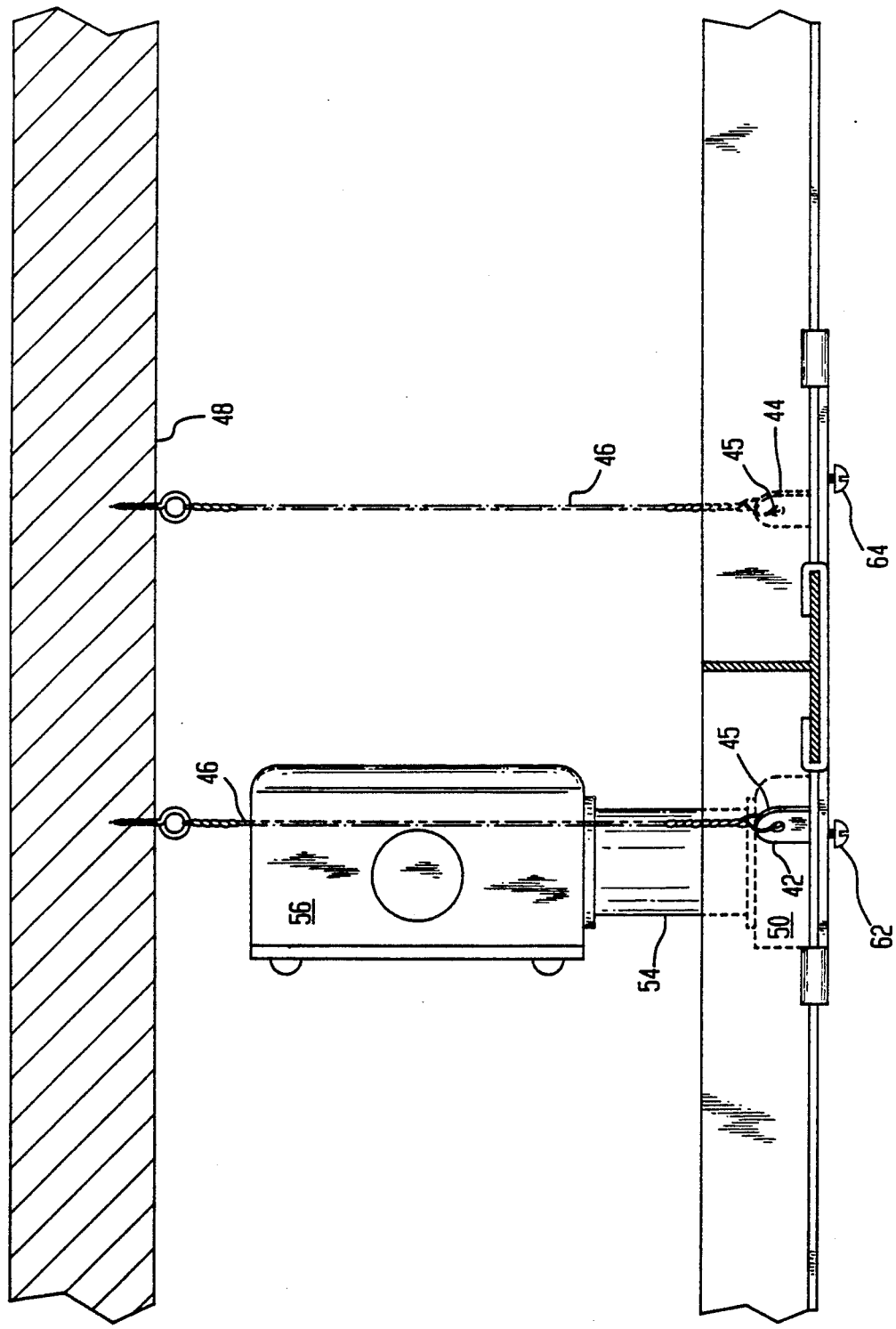
FIG. 3 is a side elevational view of the apparatus of FIG. 1 attached to the cross members of a suspended ceiling grid.

As shown in FIGS. 2 and 3, the mounting apparatus 12 consists of a substantially flat metal plate 26 having restraining tabs 30, 32, 34, and 36 through which horizontal movement of the mounting apparatus 12 is prevented. Each restraining tab has a pair of supporting tabs 38, 40 positioned so that the mounting apparatus 12 securely engages the support grid members 18, 20 of the suspended ceiling structure 16, thus preventing horizontal movement of the entire apparatus 12. In each instance, the mounting apparatus 12 will be placed at an intersection of intersecting support grid members, such as grid members 18 and 20.

Under the system of the present invention, vertical movement of the mounting apparatus 1 is also precluded. Vertical stability is achieved by two raised tabs 42, 44 each having an eye 45 through which a support cable 46 can be placed to secure the mounting apparatus 12 to a load bearing member 48 such as a joist, which also supports the ceiling structure 16. As shown in FIG. 2, these raised tabs are positioned opposite to each other to properly balance the entire apparatus.

Figure 4:
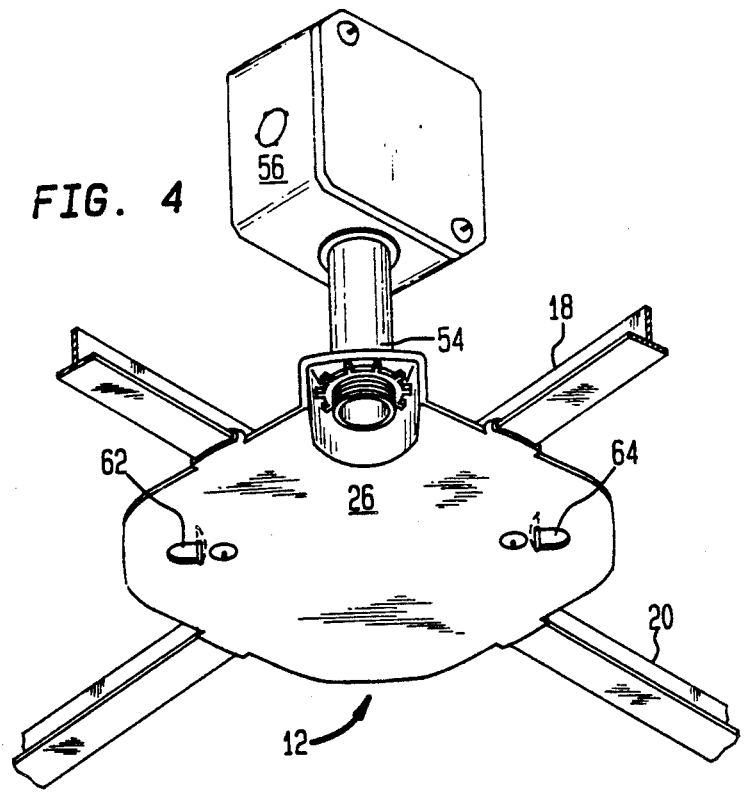
FIG. 4 is a perspective view of the mounting apparatus cooperating with the ceiling structure.
Figure 5:
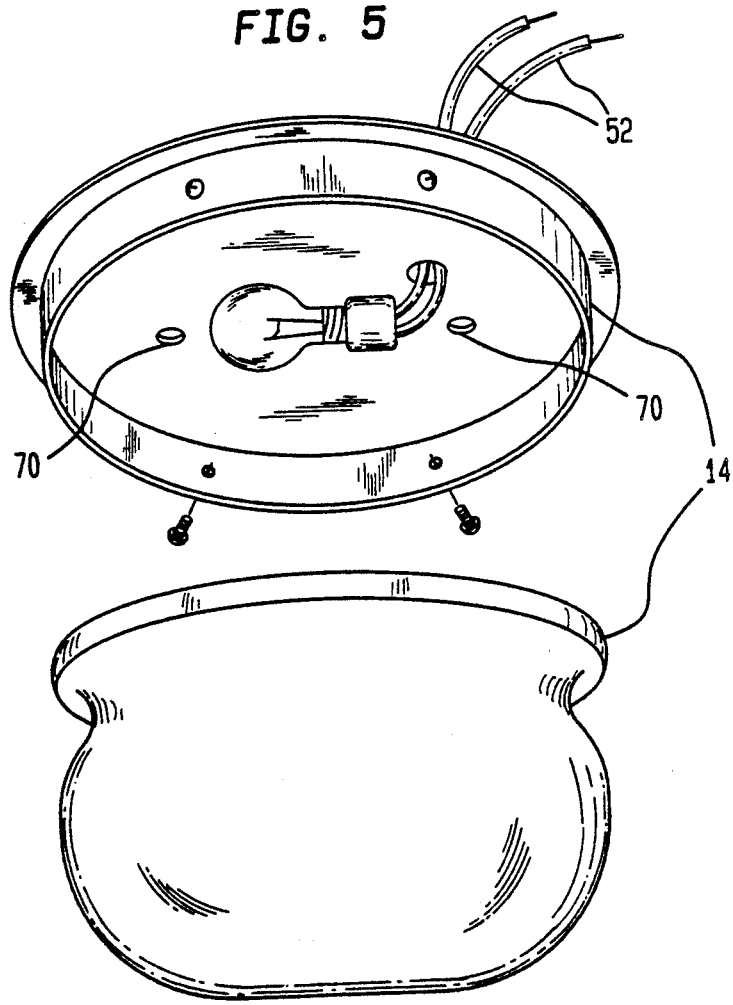
FIG. 5 is a perspective view of a common electrical lighting fixture as it relates to mounting on apparatus plate 12 in FIG. 4.

As shown in FIG. 4 & 5 one portion of the flat metal plate 26 forming the mounting apparatus 12 is a recessed area 50 which receives wires 52 that connect the electrical apparatus 14 to a power source. The housing 50 has a passage through which the wires 52 pass and which is adapted to receive a means for connecting the top of the housing 50 to an electrical box 56, preferably a hollow off-set nipple 54, although any commercially available connection means which provides a passageway for the wires 52 can be used. Electrical box 56 contains any elements needed to achieve the connection from a power source to the electrical apparatus 14 and also can be of any suitable design such as those of boxes that are commercially available in electrical supply stores.

As shown in FIG. 2, 4, & 5, two holes 58 and 60 are positioned within the metal plate 26 forming the mounting apparatus 12, which are adapted to receive screws 62 and 64. The screws 62 and 64 are inserted through holes 70 in electrical apparatus 14, then threaded into holes 56 and 60 in mounting apparatus 12 securing electrical apparatus 14 flush to grids 18 and 20.

Figure 6:
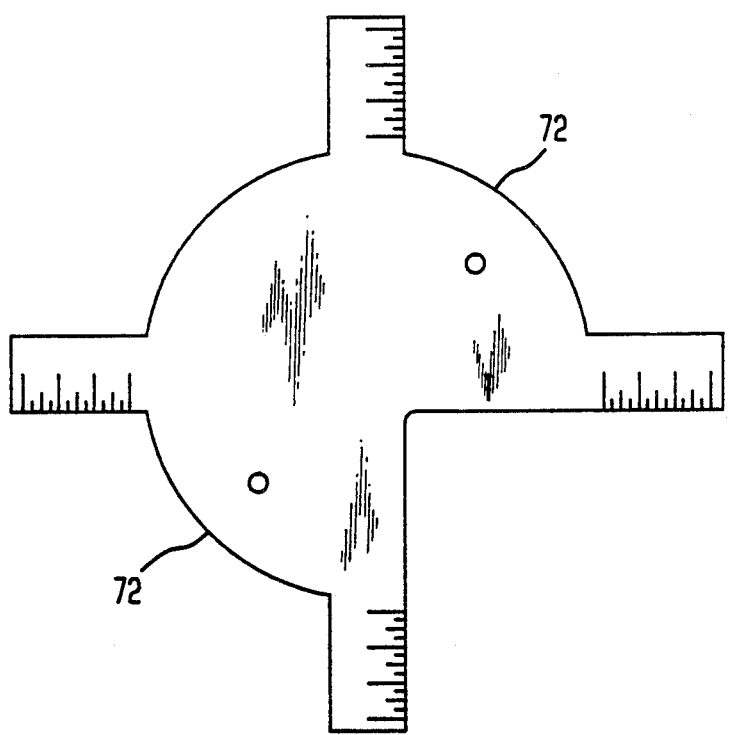

In the event that the ceiling tiles 21, 22, 23 and 24 supported by grid members 18 and 20 extend below the grid members 18 and 20, spacers 72 or 72A or 72B of appropriate thickness as shown in FIG. 6, 7, & 8 may be used to fill the space between the bottom surface of apparatus 12 and the top surface of electrical apparatus 14 allowing the to surface of 14 to be along the same plane as protruding tiles 21, 22, 23, and 24. The corners of tiles 21, 22, 23, and 24 which meet apparatus plate 12 will be cut to allow them to drop into their respective grids 18 and 20.

Figure 8:
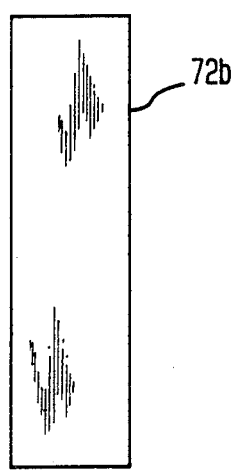
FIGS. 6, 7 and 8 are plan views of spacer members useable in conjunction with the mounting apparatus of FIGS. 2, 3 and 4.
Figure 7:
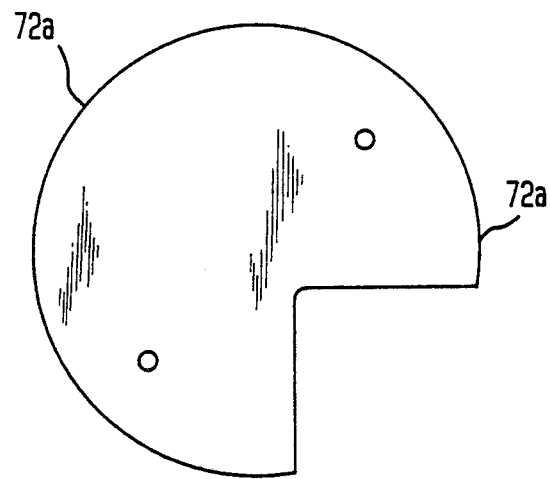

As shown in FIG. 6, spacer 72 has the same size and shape as the planar surface of the entire metal plate 26 of the mounting apparatus 12. Necessarily, cut-outs for the screws 62, 64 and housing 50 are provided therein. This spacer may be used with the average electrical apparatus, which is compatible with mounting apparatus 12. For an electrical apparatus which is very large FIGS. 7 and 8 are to be used. Spacer 72a, having the same size and shape as the planar surface of the body of metal plate 26, is used to fill the space between the electrical apparatus 14 and the mounting apparatus 12, and spacers 72b are used to fill the space between the electrical apparatus 14 and the grid members 18, 20. Such spacers may be sized according to the dimensions of the top of the electrical apparatus 14.

In as much as the present invention is subject to many variations, modifications and changes in detail, it is intended that all matter contained in the foregoing description or shown in the accompanying drawing shall be interpreted as illustrative and not in a limiting sense.

What I claim is:

1. Mounting apparatus for securing an electrical apparatus to a suspended ceiling structure, comprising:
    a support assembly having a ceiling engagement portion, said portion comprised of four pairs of tabs arranged on a common support member for engagement with support grid members of the suspended ceiling structure at an intersection of intersecting grid members thereof, cooperating with the ceiling structure to prevent horizontal movement of said support assembly with respect to the ceiling structure, a load support portion said load support portion comprises at least one upright tab, and a support cable interconnecting said tab to a load bearing member of the ceiling structure and an electrical coupling portion;
    said electrical coupling portion defining housing within which electrical connections between a source of electrical power and the electrical appliance may be made; and
    said support assembly having a mounting means to which an electrical appliance may be attached.

2. The invention as recited in claim 1 wherein said support assembly comprises a metal plate, and wherein said ceiling engagement portion, said load support portion and said electrical coupling portion, said mounting means, are contiguously formed from said metal plate as a unitary member.

3. The invention as recited in claim 2 further comprising spacer means adapted to be disposed between the metal plate of the support assembly and the top surface of the electrical appliance so as to permit the bottom surface of ceiling tiles in said suspended ceiling structure to extend below the exposed bottom face of the support grid members thereof.

4. The invention as recited in claim 1 wherein said support assembly comprises a flat support plate adapted to be disposed on the exposed planar surface of the ceiling structure and secured to said load bearing member, and wherein said electrical coupling portion is an electrical connector box mounted over the housing in said flat support plate.

* * * * *